United States Patent
Suzuki et al.

(10) Patent No.: US 9,073,286 B2
(45) Date of Patent: Jul. 7, 2015

(54) COMPOSITE MOLDED ARTICLE AND MANUFACTURING METHOD THEREOF

(75) Inventors: Akihiro Suzuki, Aichi (JP); Kohji Kamiya, Aichi (JP); Tetsuro Yamada, Aichi (JP)

(73) Assignee: TOKAI KOGYO CO., LTD., Obu (JP)

( * ) Notice: Subject to any disclaimer, the term of this patent is extended or adjusted under 35 U.S.C. 154(b) by 303 days.

(21) Appl. No.: 13/807,757

(22) PCT Filed: Jul. 1, 2011

(86) PCT No.: PCT/JP2011/065169
§ 371 (c)(1),
(2), (4) Date: Feb. 8, 2013

(87) PCT Pub. No.: WO2012/005181
PCT Pub. Date: Jan. 12, 2012

(65) Prior Publication Data
US 2013/0142990 A1    Jun. 6, 2013

(30) Foreign Application Priority Data

Jul. 8, 2010 (JP) .................................. 2010-167546

(51) Int. Cl.
*B32B 3/08* (2006.01)
*B29C 45/00* (2006.01)
(Continued)

(52) U.S. Cl.
CPC ........... *B32B 3/08* (2013.01); *Y10T 428/24289* (2015.01); *B29C 45/0055* (2013.01);
(Continued)

(58) Field of Classification Search
CPC ..................... B29C 45/1657; B29C 45/14467; B29C 45/0055; B29C 45/1676; B29C 45/1704; B29C 45/2681; B29C 45/1635; B29C 2045/1637; B29C 2045/167; B60J 10/0071; B60J 10/0082; B60J 10/02; B60J 10/0014; B60J 10/0051; B60J 10/0062; B60J 1/006; B60J 1/002

USPC ........... 264/250, 273, 274, 275; 52/716, 208; 296/84.1, 146
See application file for complete search history.

(56) References Cited

U.S. PATENT DOCUMENTS 4,894,972 A    1/1990  Endoh et al.
5,711,907 A *  1/1998  Nozaki et al. ................. 264/138
(Continued)

FOREIGN PATENT DOCUMENTS

CN    101096119 A    1/2008
CN    1636697 B      5/2010
(Continued)

OTHER PUBLICATIONS

Written Opinion issued in International Patent Application No. PCT/JP2011/065169 dated Aug. 23, 2011.
(Continued)

*Primary Examiner* — Edmund Lee
(74) *Attorney, Agent, or Firm* — Oliff PLC

(57) ABSTRACT

A method for manufacturing a composite molded article including: preparing a main body member to which a through hole is formed to a peripheral wall by removing a protruding portion protruding from a face of the peripheral wall surrounding a hollow space in the main body member having the hollow space formed therein along the longitudinal direction; setting the main body member in an injection molding die; forming a cushion member molding cavity by the main body member and a molding die face formed inside the injection molding die in the longitudinal direction of the main body member and allowing the through hole to communicate with the cavity; and filling a heated and melted elastic polymer material injected from an injection gate into the cavity and the hollow space from the through hole, thereby forming a cushion member and a filling portion.

13 Claims, 11 Drawing Sheets

(51) Int. Cl.
  *B29C 45/16* (2006.01)
  *B29C 45/17* (2006.01)
  *B60J 10/00* (2006.01)
  *B60J 10/02* (2006.01)
  *B29C 45/14* (2006.01)
  *B29L 31/30* (2006.01)

(52) U.S. Cl.
  CPC ......... *B29C45/1657* (2013.01); *B29C 45/1676* (2013.01); *B29C 45/1704* (2013.01); *B29C 2045/0058* (2013.01); *B29C 2045/1668* (2013.01); *B29L 2031/3005* (2013.01); *B29L 2031/302* (2013.01); *B60J 10/0014* (2013.01); *B60J 10/02* (2013.01); *B29C 45/14467* (2013.01); *B60J 10/0071* (2013.01); *B60J 10/0082* (2013.01)

(56) References Cited

U.S. PATENT DOCUMENTS

| 6,623,688 | B2* | 9/2003 | Gedritis et al. | 264/513 |
| 6,730,258 | B1 | 5/2004 | Ohtake et al. | |
| 7,582,243 | B2* | 9/2009 | Kubo et al. | 264/261 |
| 8,240,098 | B2* | 8/2012 | Insa | 52/459 |
| 2004/0212127 | A1 | 10/2004 | Saji et al. | |

FOREIGN PATENT DOCUMENTS

| JP | 6-278550 A | 10/1994 |
| JP | 2003-165137 A | 6/2003 |
| JP | 2007-76317 A | 3/2007 |

OTHER PUBLICATIONS

International Preliminary Report on Patentability issued in International Patent Application No. PCT/JP2011/065169 dated Feb. 12, 2013.

Office Action Issued in Chinese Patent Application No. 2011800339299 dated May 6, 2014 (with translation).

Aug. 23, 2011 International Search Report issued in International Application No. PCT/JP2011/065169 (with translation).

* cited by examiner

COMPOSITE MOLDED ARTICLE AND MANUFACTURING METHOD THEREOF

TECHNICAL FIELD

The present invention relates to a composite molded article in which a main body member and a cushion member are integrated by injection-molding the cushion member to an outer face of the main body member having a hollow space therein, and a manufacturing method thereof.

BACKGROUND ART

In moldings, such as a pillar molding mounted along a pillar of a vehicle, a main body member may be molded by gas assist molding in order to prevent sinks from being generated in the appearance of a portion that is visually recognized when being mounted on a vehicle. For example, as described in Patent Document 1 (JP-A-2003-165137), after a rigid first molding body (main body member) having a hollow space portion therein is molded by gas assist molding of a rigid polymer material, the first molding body is set in an injection molding die for molding a second molding body (cushion member). Then, a composite molded article is formed in which the first molding body and the second molding body are integrated by injecting a soft polymer material into the die so as to mold a soft second molding body and bond the second molding body to the outer face of the first molding body.

In the Patent Document 1, in order to prevent a peripheral wall (wall surrounding the periphery of the hollow space portion) of the first molding body from being deformed due to injection pressure of a melting material injected from an injection gate when the second molding body is injection-molded, it is suggested that a guide body is provided at a portion that faces the injection gate of the first molding body portion such that the melting material injected from the injection gate flows along the guide body, thereby reducing the injection pressure that acts on the peripheral wall of the first molding body.

CITATION LIST

Patent Literature

[Patent Document 1] JP-A-2003-165137

SUMMARY OF THE INVENTION

Technical Problem

However, since a composite molded article obtained by the technology of the above Patent Document 1 has the hollow space portion inside the first molding body, the peripheral wall is thin. Thus, the impact resistance at low temperature becomes low particularly when the first molding body is formed from a rigid synthetic resin and the composite molded article breaks easily. For this reason, there is a concern that broken pieces may be scattered at the time of breakage, and for example, a passenger of a vehicle that uses the composite molded article or a pedestrian may be injured.

Accordingly, the invention is intended to solve the above-described problems, and provides a composite molded article with excellent impact resistance, which is integrated by injection-molding a cushion member to a main body member having a hollow space therein, and a manufacturing method thereof.

Solution to Problem

In order to solve the above problems, the invention provides a manufacturing method of a composite molded article and a composite molded article manufactured by the manufacturing method that has each feature of the following (1) to (13).

(1)

A method for manufacturing a composite molded article which integrally includes: a main body member configured to be attached to a member to be attached, formed in an elongated shape from a polymer material having rigidity, and having a hollow space formed therein along a longitudinal direction thereof; and a cushion member formed from an elastic polymer material having a lower degree of hardness than the main body member, joined to an edge of the main body member, and having an elongated portion extending in the longitudinal direction along the edge, the method including: a step of preparing the main body member to which a through hole, which allows the hollow space to communicate with external air, is formed to a peripheral wall surrounding the hollow space by removing at least one protruding portion which is formed to one surface of the peripheral wall and protrudes toward a direction away from the peripheral wall; a step of setting the main body member in an injection molding die when the injection molding die is open, by using the openable and closable injection molding die for molding the cushion member; a step of fixing the main body member within the injection molding die, forming a molding cavity for molding the cushion member by the main body member and a molding die face formed inside the injection molding die to at least a portion of the main body member in the longitudinal direction, and allowing the through hole to communicate with the molding cavity, by closing the injection molding die; and a step of injecting the heated and melted elastic polymer material from an injection gate after the injection molding die is closed, molding the cushion member by making a portion of the elastic polymer material flow into and fill the molding cavity, and forming a filling portion that fills the hollow space by making a portion of the elastic polymer material flow into and fill the hollow space from the through hole.

(2)

A method for manufacturing a composite molded article which integrally includes: a main body member configured to be attached to a member to be attached, formed in an elongated shape from a polymer material having rigidity, and having a hollow space formed therein along a longitudinal direction thereof, and a cushion member formed from an elastic polymer material having a lower degree of hardness than the main body member, joined to an edge of the main body member, and having an elongated portion extending in the longitudinal direction along the edge, the method including: a step of preparing the main body member having at least one protruding portion on one surface of a peripheral wall surrounding the hollow space, the protruding portion protruding toward a direction away from the peripheral wall, having a root portion joined to the peripheral wall, and being configured to be broken at the root portion; a step of forming a through hole, which allows the hollow space to communicate with external air, in the peripheral wall, by breaking the protruding portion at the root portion after the molding of the main body member; a step of setting the main body member in an injection molding die when the injection molding die is open, by using the openable and closable injection molding die for molding the cushion member; a step of fixing the main body member within the injection molding die, forming a molding cavity for molding the cushion member by the main body member and a molding die face formed inside the injection molding die to at least a portion of the main body member in the longitudinal direction, and allowing the through hole to communicate with the molding cavity, by closing the injection molding die; and a step of injecting the heated and melted elastic polymer material from an injection gate after the injection molding die is closed, molding the cushion member by making a portion of the elastic polymer material flow into and fill the molding cavity, and forming a filling portion that fills the hollow space by making a portion of the elastic polymer material flow into and fill the hollow space from the through hole.

(3)

A method for manufacturing a composite molded article which integrally includes: a main body member configured to be attached to a member to be attached, formed in an elongated shape from a polymer material having rigidity, and having a hollow space formed therein along a longitudinal direction thereof; and a cushion member formed from an elastic polymer material having a lower degree of hardness than the main body member, joined to an edge of the main body member, and having an elongated portion extending in the longitudinal direction along the edge, the method comprising: a step of forming a first molding cavity by a molding die face formed inside a first injection molding die, by using the openable and closable first injection molding die for molding the main body member and closing the first injection molding die; a step of molding the main body member by filling the heated and melted polymer material into the first molding cavity from an injection gate after the injection molding die is closed and injecting a fluid into the inside of the polymer material to form the hollow space, and of molding at least one protruding portion on one surface of a peripheral wall of the main body member surrounding the hollow space, the protruding potion protruding toward a direction away from the peripheral wall, having a root portion joined to the peripheral wall, and being configured to be broken at the root portion; a step of forming a through hole, which allows the hollow space to communicate with external air, to the peripheral wall, by breaking the protruding portion at the root portion after the molding of the main body member; a step of setting the main body member in the second injection molding die when the second injection molding die is open, by using the openable and closable second injection molding die for molding the cushion member; a step of fixing the main body member within the second injection molding die, forming a second molding cavity for molding the cushion member by the main body member and a molding die face formed inside the second injection molding die to at least a portion of the main body member in the longitudinal direction, and allowing the through hole to communicate with the second molding cavity, by closing the second injection molding die; and a step of injecting the heated and melted elastic polymer material from an injection gate after the second injection molding die is closed, molding the cushion member by making a portion of the elastic polymer material flow into and fill the second molding cavity, and forming a filling portion that fills the hollow space by making a portion of the elastic polymer material flow into and fill the hollow space from the through hole.

According to the manufacturing method of any of the above (1) to (3), a manufactured composite molded article has excellent impact resistance because the elastic polymer material that forms the cushion member is filled so as to flow to the hollow space formed inside the main body member from the through hole formed in the main body member and block the hollow space. Additionally, according to the above manufacturing methods, the main body member can be kept from being damaged and scattered even when the molded product is damaged.

Moreover, according to the manufacturing method of any of the above (1) to (3), the elastic polymer material flows into the hollow space from the through hole of the main body member. Therefore, an excessive pressure can be kept from being applied to other portions, and when the elastic polymer is injection molded, the main body member can be prevented from being damaged.

(4)

The method for manufacturing a composite molded article according to the manufacturing method of (3), wherein, in the step of molding the protruding portion, a recess portion which is depressed closer to the hollow space than a rear face of the peripheral wall is molded, and the protruding portion is molded in a shape that protrudes from a bottom face of the recess portion.

According to such a manufacturing method, removal of the protruding portion is easy and the through hole can be stably formed.

(5)

The method for manufacturing a composite molded article according to the manufacturing method of (3) or (4), wherein, in the step of molding the protruding portion, the protruding portion is molded in a columnar shape and the recess portion is formed in a circular shape.

According to such a manufacturing method, the protruding portion can be removed from every direction and removal work becomes easy.

(6)

The method for manufacturing a composite molded article according to the manufacturing method of (5), wherein, in the step of molding the protruding portion, the protruding portion is molded such that a diameter of the protruding portion becomes smaller than a diameter of the recess portion.

According to such a manufacturing method, since the protruding portion can be easily displaced, removal of the protruding portion becomes easy.

(7)

The method for manufacturing a composite molded article according to the manufacturing method of (6), wherein, in the step of molding the protruding portion, the recess portion and the protruding portion are molded so as to be coaxial with each other.

According to such a manufacturing method, since the through hole can be formed at the center of the recess portion, formation of the through hole is stabilized.

(8)

The method for manufacturing a composite molded article according to any one of the manufacturing methods of (3) to (7), wherein the composite molded article has a first edge that faces a first portion of the member to be attached when being attached to the member to be attached, and a second edge that faces a second portion at a position different from the first portion, wherein the second molding cavity includes a cavity that molds the first edge, a cavity that molds the second edge, and a coupling channel that couples the first edge molding cavity and the second edge molding cavity, wherein the through hole is formed so as to communicate with the coupling channel, and wherein, in the step of molding the cushion member, the elastic polymer material flows into the hollow space from the coupling channel via the through hole.

According to such a manufacturing method, the cushion members can be molded at both the first edge and the second edge by a single step of injection molding, and further, the elastic polymer material can be made to flow into the hollow space within the main body member in the same step. For this reason, it is possible to efficiently manufacture a composite molded article in which the cushion members are formed at both the first edge and the second edge and the hollow space is filled with and blocked by the elastic polymer material.

(9)

The method for manufacturing a composite molded article according to any one of the manufacturing methods of (3) to (7), wherein a communication hole that allows the hollow space to communicate with the external air is formed at a position different from that of the through hole of the main body member, and wherein, in the step of molding the cushion member, the elastic polymer material flows into the hollow space from the through hole and gas within the hollow space is discharged to the outside from the communication hole.

According to such a manufacturing method, since the gas that exists within the hollow space can be discharged to the outside when the elastic polymer material flows into the hollow space, the elastic polymer material can be made to flow into the hollow space smoothly. Additionally, gas can be prevented from remaining within the hollow space.

(10)

The method for manufacturing a composite molded article according to the manufacturing method of (9), wherein the communication holes are formed at at least two locations, and the through hole is formed between the communication holes.

According to such a manufacturing method, the gas in the hollow space can be efficiently discharged to the outside during inflow of the elastic polymer material.

(11)

The method for manufacturing a composite molded article according to the manufacturing method of (9) or (10), wherein the communication hole is at least one of an injection hole and a discharge hole for the fluid that forms the hollow space in the step of molding the main body member.

According to such a manufacturing method, since the injection hole and discharge hole formed when the main body member is molded can be used as communication holes, it is not necessary to separately provide a communication hole.

(12)

The method for manufacturing a composite molded article according to any one of the manufacturing methods (3) to (11), wherein a jig is used in the step of forming the through hole.

According to such a manufacturing method, the composite molded article can be efficiently molded, and molding of the cushion member from the molding of the main body member can be automated.

(13)

A composite molded article manufactured by the manufacturing method according to any one of the manufacturing methods of (3) to (12).

Such a composite molded article has excellent impact resistance, and can be efficiently manufactured.

DESCRIPTION OF EMBODIMENTS

Hereinafter, one embodiment in which a mode for carrying out the invention is applied to a pillar molding mounted along a front pillar of a vehicle is embodied will be described.

First, the schematic configuration of a pillar molding 8 will be described with reference to FIGS. 1 to 4.

Figure 1:
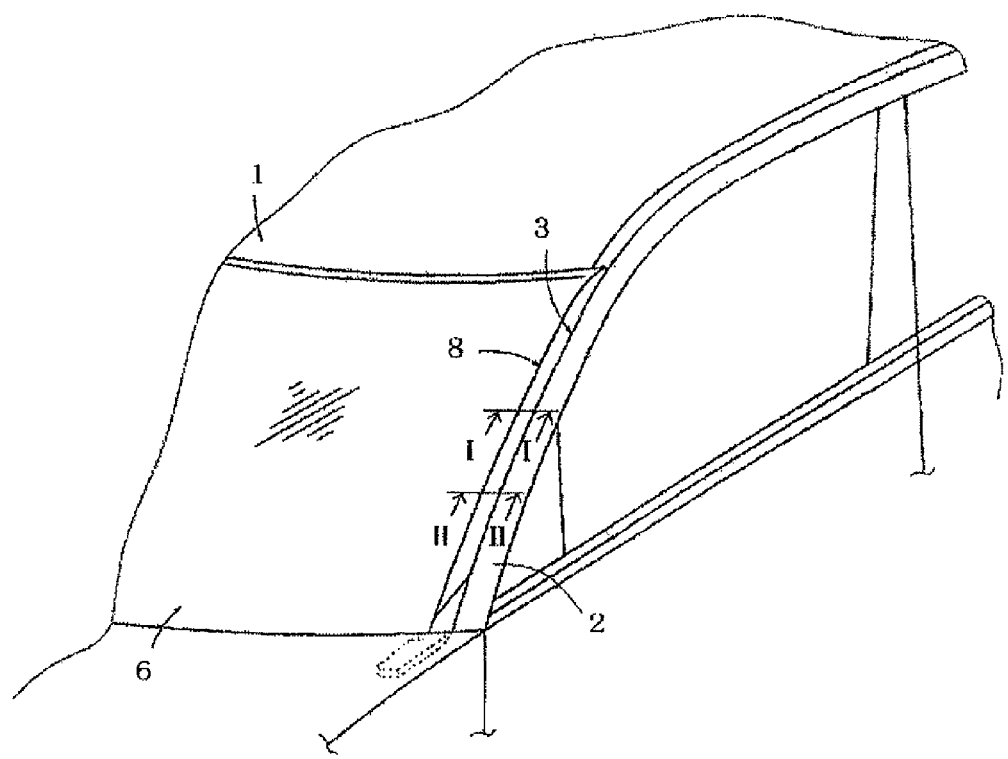
FIG. 1 is a perspective view of a vehicle showing an attachment position of a pillar molding in one embodiment of the invention.
Figure 2:
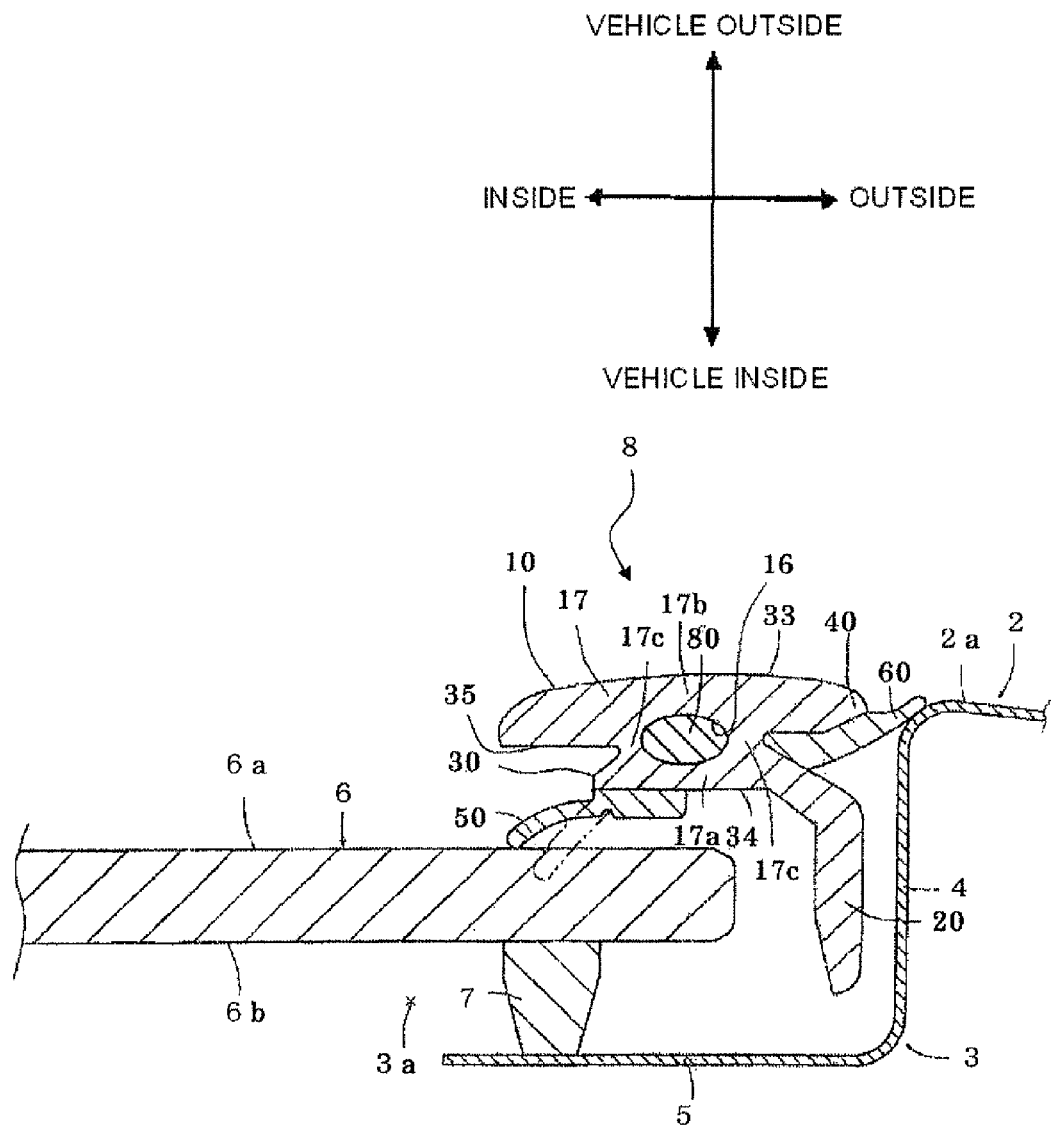
FIG. 2 is a cross-sectional view taken along line I-I of FIG. 1.

As shown in FIGS. 1 and 2, the pillar molding 8 (composite molded article) has a main molding body 10 (main body member), a first cushion member 50, and a second cushion member 60. The pillar molding 8 is mounted between a front pillar 2 and a window pane 6. As the first cushion member 50 and the second cushion member 60 having cushioning properties come into elastic contact with respective to members to be attached, that is, the front pillar 2 and the window pane 6, the pillar molding 8 prevents the respective members to be attached from being damaged and prevents occurrence of abnormal noise resulting from vibration when the vehicle is moving. Additionally, when the vehicle is moving, rainwater is dammed by a recess portion constructed between the rear face of the main molding body 10 of the pillar molding 8, and the first cushion member 50, and is allowed to flow downward or flow upward. Thereby, since rainwater is prevented from going over (crossing) the pillar molding 8 and flowing toward a window pane (side glass) at a side of the vehicle, it becomes possible to secure a side view of a passenger.

As shown in FIGS. 1 and 2, the elongated pillar molding 8 is mounted along a window opening edge 3 (a first portion of a member to be attached) formed over the roof panel 1 and the front pillar 2 that are portions of a vehicle body panel. The window opening edge 3 includes an outer panel 2a, a side flange 4 formed along the peripheral edge portion of the window opening edge 3, and a bottom flange 5 that is bent and overhung approximately at a right angle inward from the side flange 4. A dam rubber 7 made of an elastic is bonded to body along the peripheral edge portion of a rear face 6b of the window pane 6 (a second portion of the member to be attached). The window pane 6 is made of a transparent glass plate, a resin plate, or the like and covers the window opening portion 3a of the window opening edge 3. The window pane 6 is fitted into the window opening edge 3, and is bonded to the window opening edge 3 by an adhesive sealant (not shown), in a state where the dam rubber 7 is pressed against the bottom flange 5 and is elastically deformed.

As shown in FIG. 2, the main molding body 10 is capable of being attached to the window opening edge 3 or the window pane 6. Additionally, the main molding body 10 has a front face 33 arranged to face the outside of the vehicle and rear faces 34 and 35 arranged to face the inside of the vehicle, when the pillar molding 8 is attached to the vehicle body. Moreover, the main molding body 10 has a first edge 30 that faces a vehicle outer face 6a of the window pane 6 and a second edge 40 that faces the side flange 4 of the window opening edge 3 or the vehicle outer face of the front pillar 2, when the pillar molding 8 is attached to the vehicle body. A hollow space 16 that has an inner shape (width) smaller than the distance between both the edges 30 and 40 is formed along the longitudinal direction inside the main molding body 10 between the first edge 30 and the second edge 40.

The hollow space 16 of the main molding body 10 is formed by a peripheral wall 17 surrounding the hollow space 16, and the peripheral wall 17 includes a rear wall 17a that forms the rear face side, a front wall 17b that faces the rear wall 17a, and a pair of side walls 17c that connect the rear wall 17a and the front wall 17b.

Additionally, the hollow space 16 is filled with the same material as a material that forms the cushion member 9 over its entire length, and forms a filling portion 80 inside the hollow space 16.

The first cushion member 50 comes into elastic contact with the vehicle outer face 6a of the window pane 6 in a state where the pillar molding 8 is attached to the vehicle body. Additionally, the second cushion member 60 comes into contact with the vehicle body panel as the member to be attached, that is, a top portion of the side flange 4 of the window opening edge 3 or the vehicle outer face of the front pillar 2 that is continuous with this top portion.

Additionally, a rib portion 20 that protrudes continuously along the longitudinal direction is formed from the rear face 34 side of the main molding body 10. Note that, the rib portion 20 may be formed so as to protrude intermittently from the rear face 34 side of the main molding body 10, instead of the above example.

Figure 5:
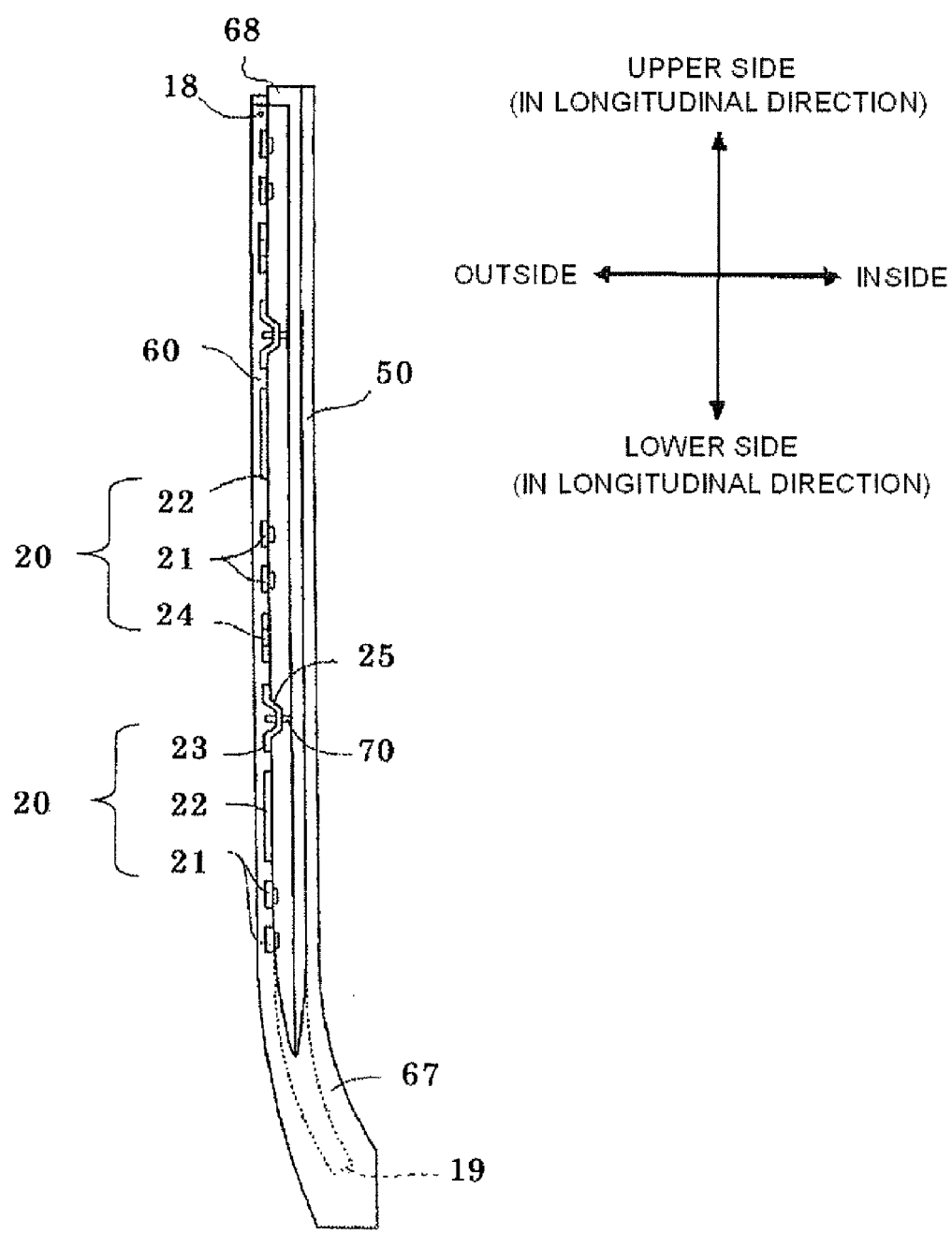
FIG. 5 is a back view of the pillar molding.

As shown in FIG. 5, the rib portion 20 of the main molding body 10 forms a plate-like attachment rib portion 21 and first to third reinforcing ribs 22, 23, and 24, in a plurality of upper, lower, and intermediate locations in the longitudinal direction respectively. The attachment rib portion 21 is formed in order to attach the main molding body 10 to the vehicle body panel, and the first reinforcing rib 22 is formed in order to improve rigidity (difficulty of bending) in the longitudinal direction of the whole pillar molding 8.

As shown in FIG. 5, an avoiding rib 25 is formed at the central portion of the second reinforcing rib 23 in the longitudinal direction so as to be offset inside (inside direction shown in FIG. 5) from the longitudinal direction in which the second reinforcing rib 23 extends. Additionally, a side face of the avoiding rib 25 is used as one side wall of an injection passage 280 of a second injection molding die 200 to be described later. Additionally, a coupling hole 26 for molding a coupling portion 70 that couples the first cushion member 50 and the second cushion member 60 in a cross-sectional direction (a direction orthogonal to the longitudinal direction of the pillar molding 8) is formed at a root portion of the avoiding rib 25 (refer to FIGS. 3 and 8).

Additionally, the third reinforcing rib 24 is formed in order to fix the main molding body 10 to the second injection molding die 200 during injection molding of cushion members to be described later. The tip of the third reinforcing rib 24 may be formed so as to extend further than the other reinforcing ribs. The extending portion may be removed by cutting or the like after cushion members, such as the first cushion member 50 and the second cushion member 60, are molded.

Figure 3:
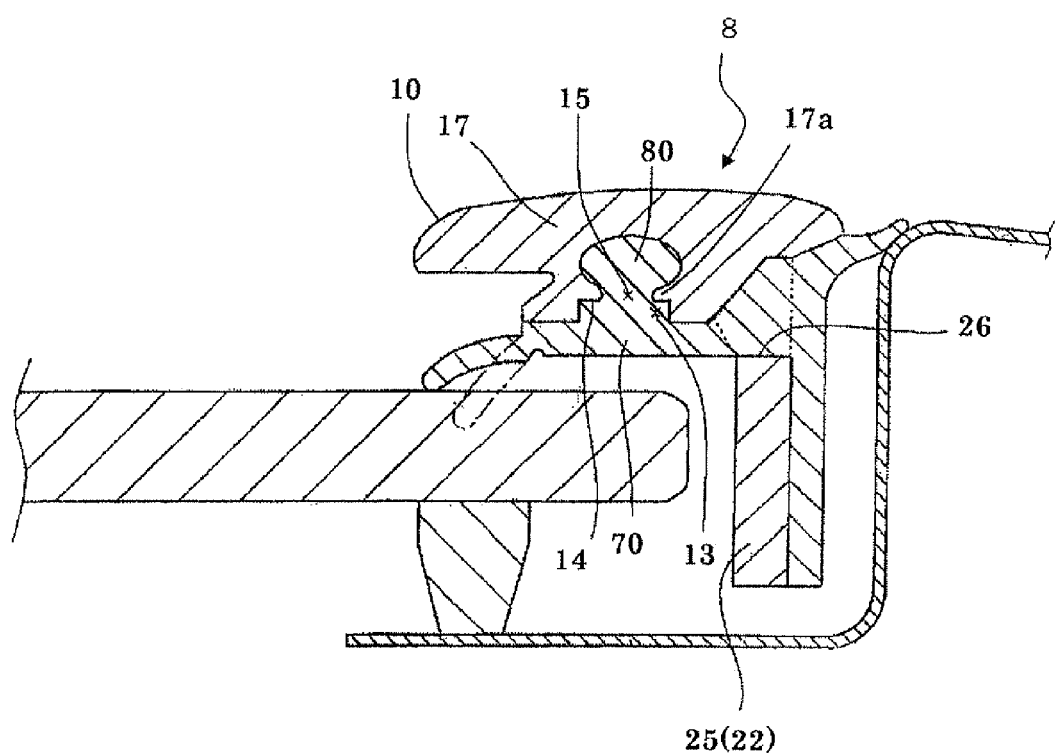
FIG. 3 is a cross-sectional view taken along line II-II of FIG. 1.

Additionally, as shown in FIG. 3, the rear wall 17a of the peripheral wall 17 is formed with a recess portion 13 that is circularly depressed toward the hollow space 16. A bottom face 14 of the recess portion 13 is formed with a through hole 15. The through hole 15 is formed by removing a protruding portion 11 to be described later.

Additionally, as shown in FIG. 5, the rear face of the main molding body 10 is formed with a gas injection hole 18 through which gas (fluid) is injected and a gas discharge hole 19 through which gas is discharged, when the main molding body 10 is formed by gas assist injection molding to be described below. The gas injection hole 18 is formed at one end of the main molding body 10 in the longitudinal direction. Additionally, the gas discharge hole 19 is formed at the other end (an end opposite to the end where the gas injection hole 18 is present) of the main molding body 10 in the longitudinal direction.

Figure 4:
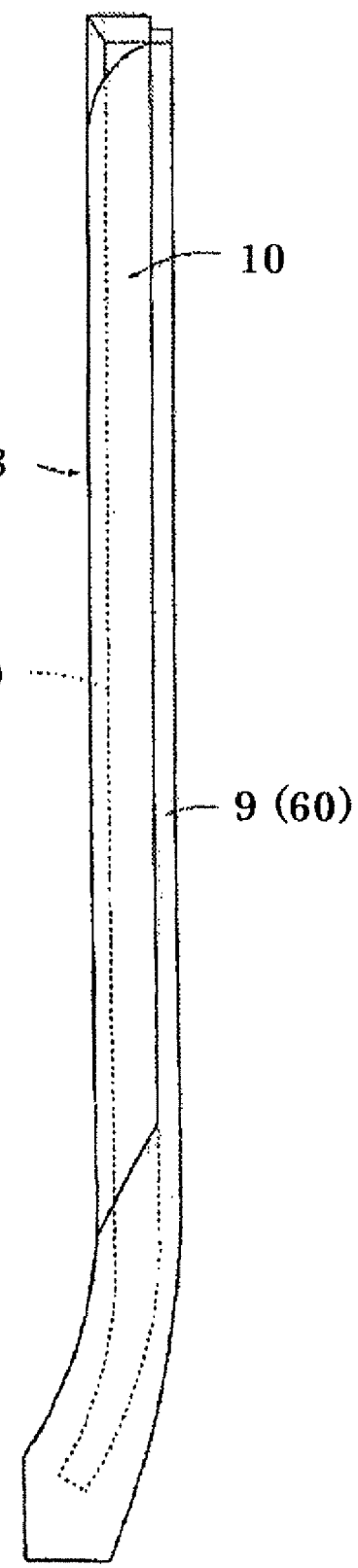
FIG. 4 is a front view of the pillar molding.

As shown in FIGS. 4 and 5, the pillar molding 8 is formed by injection-molding the cushion member 9 onto at least the outer face of the main molding body 10 to integrate the main molding body 10 and the cushion member 9. The cushion member 9 is integrally provided along the outer peripheral edge of the main molding body 10 so that the cushion member 9 surrounds the outer periphery of the main molding body 10 in the longitudinal direction.

Additionally, as shown in FIGS. 4 and 5, a terminal cover portion 67 is formed at a lower end of the main molding body 10 in the longitudinal direction. The terminal cover portion 67 covers the lower end of the main molding body 10 in the longitudinal direction, and couples a lower end of the first cushion member 50 and a lower end of the second cushion member 60.

Additionally, a terminal cushion portion 68 is formed at an upper end of the main molding body 10 in the longitudinal direction. The terminal cushion portion 68 covers the upper end of the main molding body 10 in the longitudinal direction, and couples an upper end of the first cushion member 50 and an upper end of the second cushion member 60.

The terminal cover portion 67 and the terminal cushion portion 68 are formed from the same thermoplastic polymer material as the first cushion member 50 and the second cushion member 60. The terminal cover portion 67 and the terminal cushion portion 68 and are molded by injection molding simultaneously with both the cushion members 50 and 60.

The main molding body 10 is molded by using a thermoplastic polymer material, (polymer material) for molding a main molding body, which is harder than the cushion member 9 and has rigidity. For example, thermoplastic synthetic resins, such as acrylonitrile butadiene styrene resin (ABS resin), acrylonitrile ethylene propylene styrene resin (AES resin), rigid or semi-rigid polyvinyl chloride resin (rigid PVC resin), polycarbonate resin (PC resin), polypropylene resin (PP resin), polyethylene resin (PE resin), polystyrene resin (PS resin), and polyamide resin (PA resin), are used as the thermoplastic polymer material that molds the main molding body 10.

On the other hand, the cushion member 9 is molded using a thermoplastic polymer material (elastic polymer material) for molding a cushion member, which is softer than the main molding body 10. For example, thermoplastic synthetic resins, such as soft polyvinyl chloride resin (plasticized PVC resin), chlorinated ethylene copolymer, ethylene vinyl acetate (EVA), and olefin-based or styrene-based thermoplastic elastomer, are used. Additionally, the hardness of the thermoplastic polymer materials for molding a cushion member is preferably JISA 60 to 80.

In addition, this hardness is measured using a type A durometer based on JISK6273.

Moreover, if materials having SP (solubility parameter) values that are equal to or approximate to each other are selected and used as the molding materials of the main molding body 10 and the cushion member 9, both the molding materials are melted together and heat-welded when the cushion member 9 is injection-molded. However, combinations of any kind of molding materials may be selected as long as an adhesive layer that bonds the molding materials of the main molding body 10 and the cushion member 9 is formed in advance on the surface of the main molding body 10 such that both the molding materials are bonded via the adhesive layer.

In the Embodiment 1, the main molding body 10 is gas assist injection molded from AES resin. Additionally, the cushion member 9 is injection-molded along the longitudinal direction of the main molding body 10 from the styrene-based thermoplastic elastomer.

In addition, in the present embodiment, sides that become the upper side and lower side in the direction of gravitational force when the pillar molding 8 is attached to the vehicle are referred to as the upper side and lower side, respectively. Additionally, the longitudinal direction refers to the longitudinal direction of the pillar molding 8, and a direction orthogonal to the longitudinal direction is referred to as width direction.

Next, a method for manufacturing the pillar molding 8 will be described with reference to FIGS. 6 to 12.

First, a main molding body molding step for molding the main molding body 10 will be described with reference to FIGS. 6 and 7.

Figure 6:
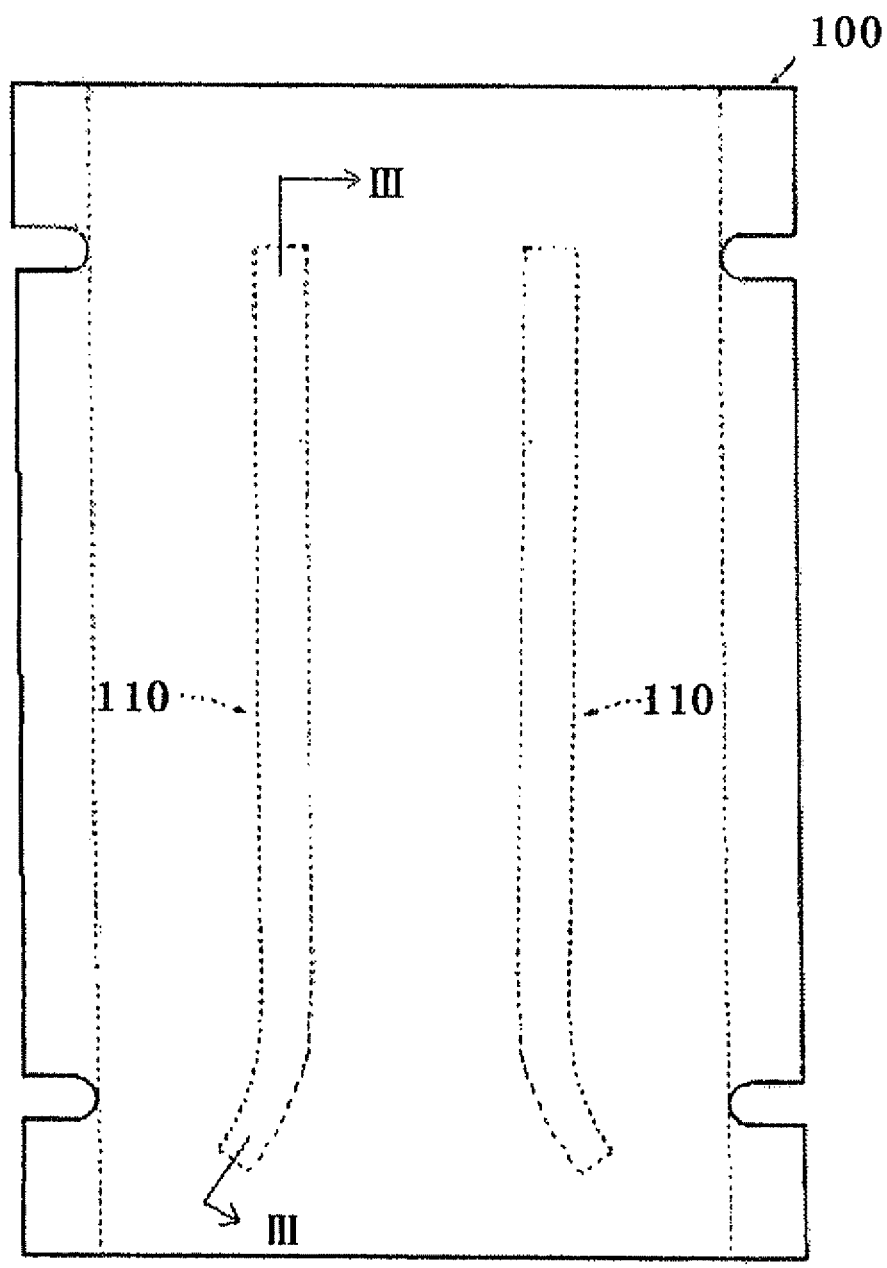
FIG. 6 is a plan view of a first injection molding die.
Figure 7:
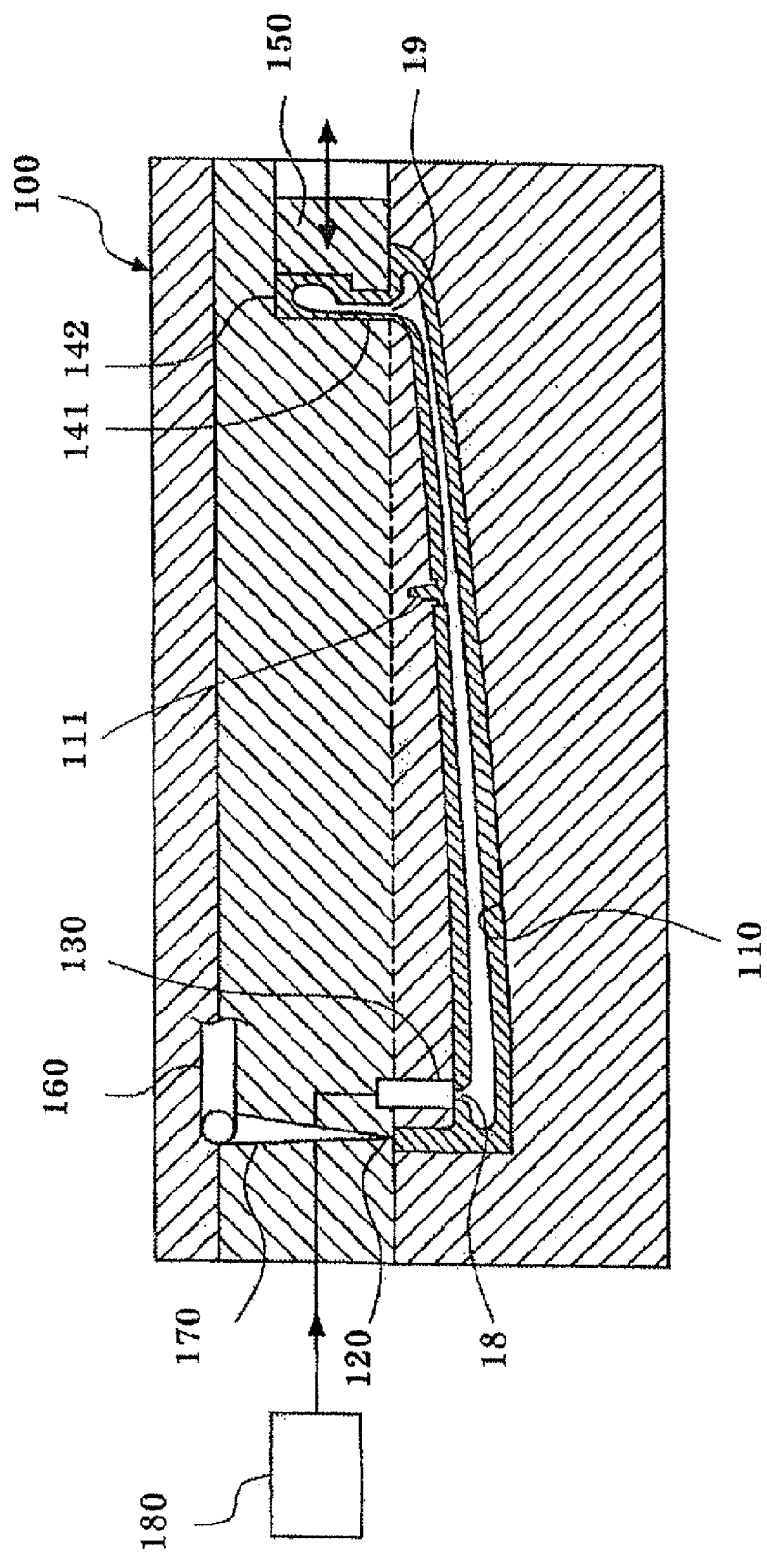
FIG. 7 is a cross-sectional view taken along line III-III of FIG. 6.

As shown in FIGS. 6 and 7, an openable and closable first injection molding die 100 for injection-molding the main molding body 10 is provided with a main molding body molding cavity 110 (first molding cavity). Moreover, as shown in FIG. 7, the first injection molding die 100 is provided with an injection gate 120 that allows a thermoplastic polymer material for molding a main molding body to be injected into the main molding body molding cavity 110. Moreover, a gas injection portion 130 that allows high-pressure gas for forming a hollow space to be injected into the main molding body molding cavity 110 is provided in the vicinity of the injection gate 120.

Additionally, the main molding body molding cavity 110 includes a protruding portion molding cavity 111 for molding the protruding portion 11.

Moreover, a cavity 142 for discharge, which communicates with a portion that the thermoplastic polymer material for molding a main molding body injected into the main molding body molding cavity 110 reaches last (the end opposite the injection gate 120 in the longitudinal direction of the main molding body molding cavity 110) via a discharge channel 141, is provided. A portion of an inner wall face that forms the cavity 142 for discharge is formed by a movable slide core 150.

The main molding body molding cavity 110 is formed by closing the first injection molding die as described above.

After the main molding body molding cavity 110 is formed, molding of the main molding body 10 is performed.

The thermoplastic polymer material for molding a main molding body that is injected from an injection molding machine (not shown) and is heated and melted flows in a route of runner 160→sprue 170→injection gate 120→main molding body molding cavity 110 and protruding portion molding cavity 111→cavity 142 for discharge. The high-pressure gas pumped from a high-pressure gas supply source 180 (for example, high-pressure gas pump) flows in a route of gas injection portion 130→main molding body molding cavity 110 and removal scheduled portion molding cavity 111→cavity 142 for discharge. In addition, the position where the high-pressure gas is injected may be appropriately changed. For example, the high-pressure gas may be injected from the runner 160, an injection nozzle (not shown), or the like.

In this main molding body molding step, the main molding body 10 having the hollow space 16 is formed by injecting and filling the thermoplastic polymer material (for example, thermoplastic synthetic resin) for molding a main molding body into the main molding body molding cavity 110 of the first injection molding die 100 and by performing the gas assist injection molding (to be described later) of injecting a fluid (for example, nitrogen gas) for forming a hollow space. Thereby, the main molding body 10 that prevents sinks from being generated can be easily molded.

Figure 8:
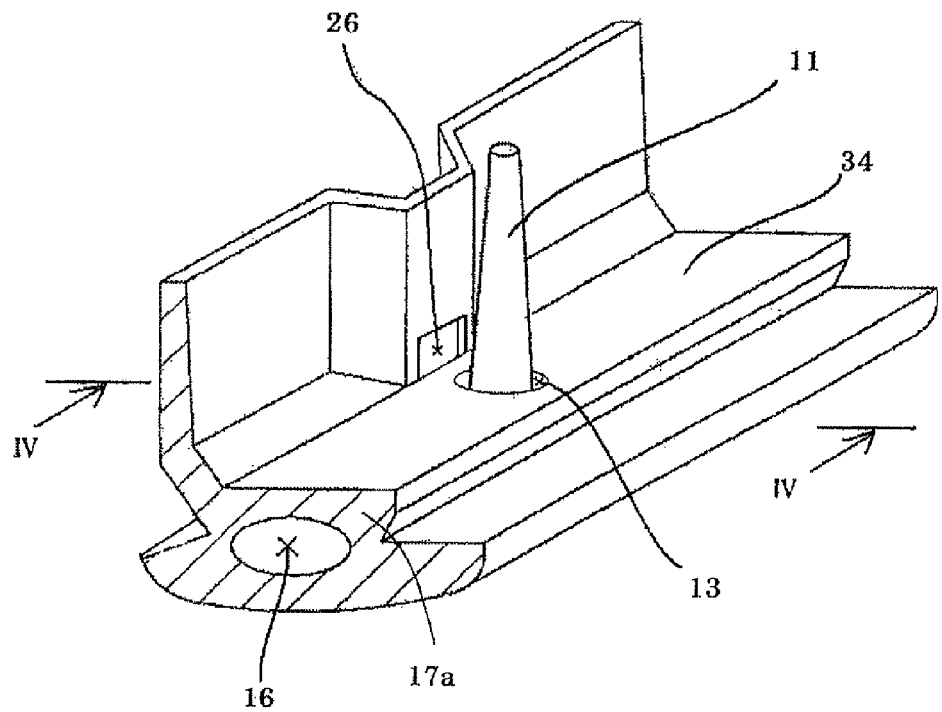
FIG. 8 is a perspective view of a main body member in one embodiment of the invention.
Figure 9:
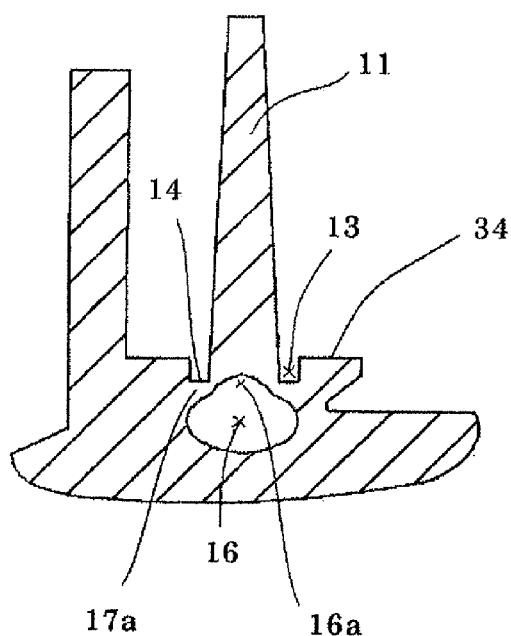
FIG. 9 is a cross-sectional view taken along line IV-IV of FIG. 8.

As shown in FIGS. 8 and 9, the rear wall 17a of the peripheral wall 17 surrounding the hollow space 16 of the main molding body 10 is formed with the recess portion 13 that is circularly depressed toward the hollow space 16 side. Additionally, the columnar protruding portion 11 protrudes perpendicularly to the rear face 34 of the main molding body 10 from the bottom face 14 of the recess portion 13.

The protruding portion 11 is formed so as to protrude in a direction away from the hollow space 16, and the cross-sectional shape of a root portion thereof is a circular shape that is coaxial with the shape of the recess portion 13. Additionally, the diameter of the cross-section of the protruding portion 11 is smaller than the diameter of the recess portion 13. In this way, since the protruding portion 11 is columnar and the circular recess portion 13 and the cross-section of the protruding portion 11 are coaxially formed, there are no restrictions in directions during molding or breaking, and the flexibility in design of a product or a jig or in the removal (breaking) work of the protruding portion 11 to be described later becomes high.

Additionally, the hollow space 16 enters the inside of the protruding portion 11 to form the hollow space 16a within the protruding portion 11. This is a shape that is formed because a polymer material does not get cold easily compared to other portions at a joining portion where the rear wall 17a is formed with the protruding portion 11 and high-pressure gas enters the protruding portion 11 side when the high-pressure gas is injected. By forming the hollow space 16a within the protruding portion 11, the rear wall 17a becomes thin at the joining portion of the protruding portion 11. Therefore, the protruding portion 11 can be easily broken and removed at the joining portion. Moreover, if the hollow space 16a within the protruding portion 11 is formed beyond the bottom face 14 of the recess portion 13 in the protrusion direction of the protruding portion 11, this is preferable because the protruding portion 11 can be more easily broken and removed and the through hole 15 can be more reliably formed.

Although the columnar shape intends to include a partially conical shape (refer to FIG. 8), the shape of the protruding portion 11 is not limited to the columnar shape. A semi-columnar shape, a quadrangular prism shape, a quadrangular pyramidal shape, a triangular prism shape, a triangular pyramidal shape, or the like may be adopted, and arbitrary shape and length that are required for breaking and is capable of being molded can be set. Additionally, the shape of the recess portion 13 is not limited to the circular shape, and can be formed in arbitrary shapes in consideration of the ease of breaking or ease of molding in the protruding portion 11, or the like. Moreover, the depth of the recess portion 13 can be set to such a depth that the recess portion does not pass through the rear wall 17a and does not become an obstruction when breaking the protruding portion 11.

Additionally, as for the protruding portion 11 formed in the main molding body 10, the through hole 15 formed by the breaking of the protruding portion 11 is preferably formed at a position where the through hole communicates with the cushion member molding cavity 210 (second forming mold cavity) when the main molding body 10 is placed and fixed at a predetermined position within the second injection molding die 200 to be described later (a position where the through hole is not blocked by a molding face of the second injection molding die 200). Additionally, the protruding portion 11 is formed at at least one location in the longitudinal direction. The position and number of the protruding portion 11 to be formed can be appropriately set depending on the shape of a product, the flowability of the thermoplastic polymer material, the position of the injection gate, or the like. In addition, although the through hole 15 may be used as a hole that allows a thermoplastic polymer material for molding a cushion member to flow into the hollow space 16 as will be described later, the through hole may be used as a hole that allows the gas within the hollow space 16 to be discharged to the outside when the thermoplastic polymer material is made to flow to the hollow space 16.

The gas assist injection molding can be performed in the following manner.

After the first injection molding die 100 is closed, a heated and melted thermoplastic polymer material for molding a main molding body is injected into the main molding body molding cavity 110 from the injection gate 120. A heated and melted thermoplastic polymer material for molding a main molding body fills the main molding body molding cavity 110, and the inside of the entire main molding body molding cavity 110 is filled with the thermoplastic polymer material for molding a main molding body. Thereafter, the injection of the thermoplastic polymer material for molding a main molding body is stopped.

Moreover, before the thermoplastic polymer material for molding a main molding body that fills the main molding body molding cavity 110 solidifies (in a state where at least a center of a thick-walled portion in a cross section is soft), high-pressure gas is injected from the gas injection portion 130 into the thermoplastic polymer material for molding a main molding body filled into the main molding body molding cavity 110. Thereby, the gas injection hole 18 that allows gas to be injected therethrough is formed at a position corresponding to the gas injection portion 130 in the thermoplastic polymer material that molds the main molding body 10.

Since the high-pressure gas injected into the thermoplastic polymer material for molding a main molding body expands and flows while forming the hollow space 16 inside the thermoplastic polymer material for molding a main molding body, a portion of the thermoplastic polymer material for molding a main molding body within the main molding body molding cavity 110 is discharged to the cavity 142 for discharge. In addition, the volume of the cavity 142 for discharge is set to be greater than the volume of the hollow space 16 of the main molding body 10. Accordingly, the high-pressure gas flows to at least the discharge channel 141, and the hollow space 16 is continuously formed to at least the discharge channel 141. Thereby, the discharge hole 19 that allows gas to be discharged therethrough is formed at a position corresponding to the discharge channel 141 in the thermoplastic polymer material that molds the main molding body 10 (so-called full shot method).

Although the main molding body 10 of the invention can be molded by the above-described full shot method, the main molding body can also be molded by other methods. For example, the main molding body 10 can also be molded by a so-called short shot method. In this case, when a heated and melted thermoplastic polymer material is injected into a molding cavity and the injection amount (filling amount) of the thermoplastic polymer material has reached a predetermined amount (about 75 to 90% of amount of the volume of the molding cavity) smaller than the volume of the molding cavity, the injection of the thermoplastic polymer material for molding a main molding body is stopped. Then, high-pressure gas is injected into the thermoplastic polymer material that fills the molding cavity before the thermoplastic polymer material that fills the molding cavity solidifies.

After the gas assist injection molding is performed as described above, the main molding body 10 having the hollow space 16 therein is molded by cooling and solidifying the thermoplastic polymer material for molding a main molding body within the main molding body molding cavity 110 while maintaining the pressure of the high-pressure gas. Then, after the thermoplastic polymer material for molding a main molding body within the main molding body molding cavity 110 solidifies, the first injection molding die 100 is opened and the main molding body 10 is taken out.

Additionally, the gas injection hole 18 formed at the position corresponding to the gas injection portion 130 is left in the taken-out main molding body 10 as a communication hole that allows the hollow space 16 to communicate with the outside. The portion including the gas injection hole 18 is cut into a predetermined shape if necessary. Additionally, by cutting a discharge material portion (a portion molded by using the polymer material discharged to the cavity 142 for discharge) coupled to the main molding body 10, the discharge hole 19 formed at the position corresponding to the discharge channel 141 is left as a communication hole that allows the hollow space 16 to communicate with the outside. Since the gas discharge hole 19 is not formed to the main molding body 10 when the main molding body 10 is molded by the short shot method using an injection molding die that is not provided with the cavity 142 for discharge, a hole may be made at a predetermined position by a tool to form a communication hole.

Figure 10:
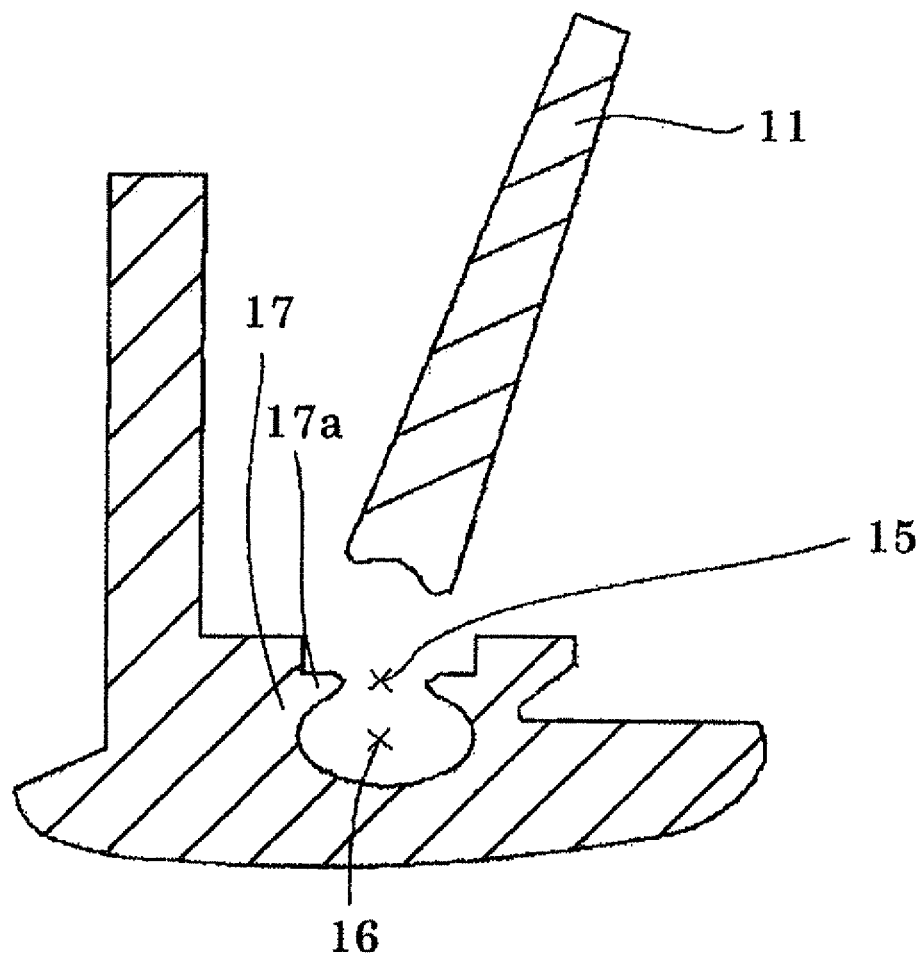
FIG. 10 is a view equivalent to an IV-IV cross-section showing a step of removing a protruding portion.

Next, a step of forming the through hole 15 will be described with reference to FIG. 10.

The main molding body 10 formed with the protruding portion 11 as described above is taken out from the first injection molding die 100. Then, the through hole 15 that allows the hollow space 16 to communicate with external air is formed in the rear wall 17a of the peripheral wall 17 by removing the protruding portion 11. Although the protruding portion 11 is preferably removed such that the whole protruding portion 11 is displaced using a jig and broken (broken off) from the root, the protruding portion may be manually broken off or may be cut out from the root using a nipper or the like.

Additionally, a mechanism that breaks the protruding portion 11 may be provided at the first injection molding die 100 to break the protruding portion 11 simultaneously with taking out a main molding body portion 12 from the first injection molding die 100.

Figure 11:
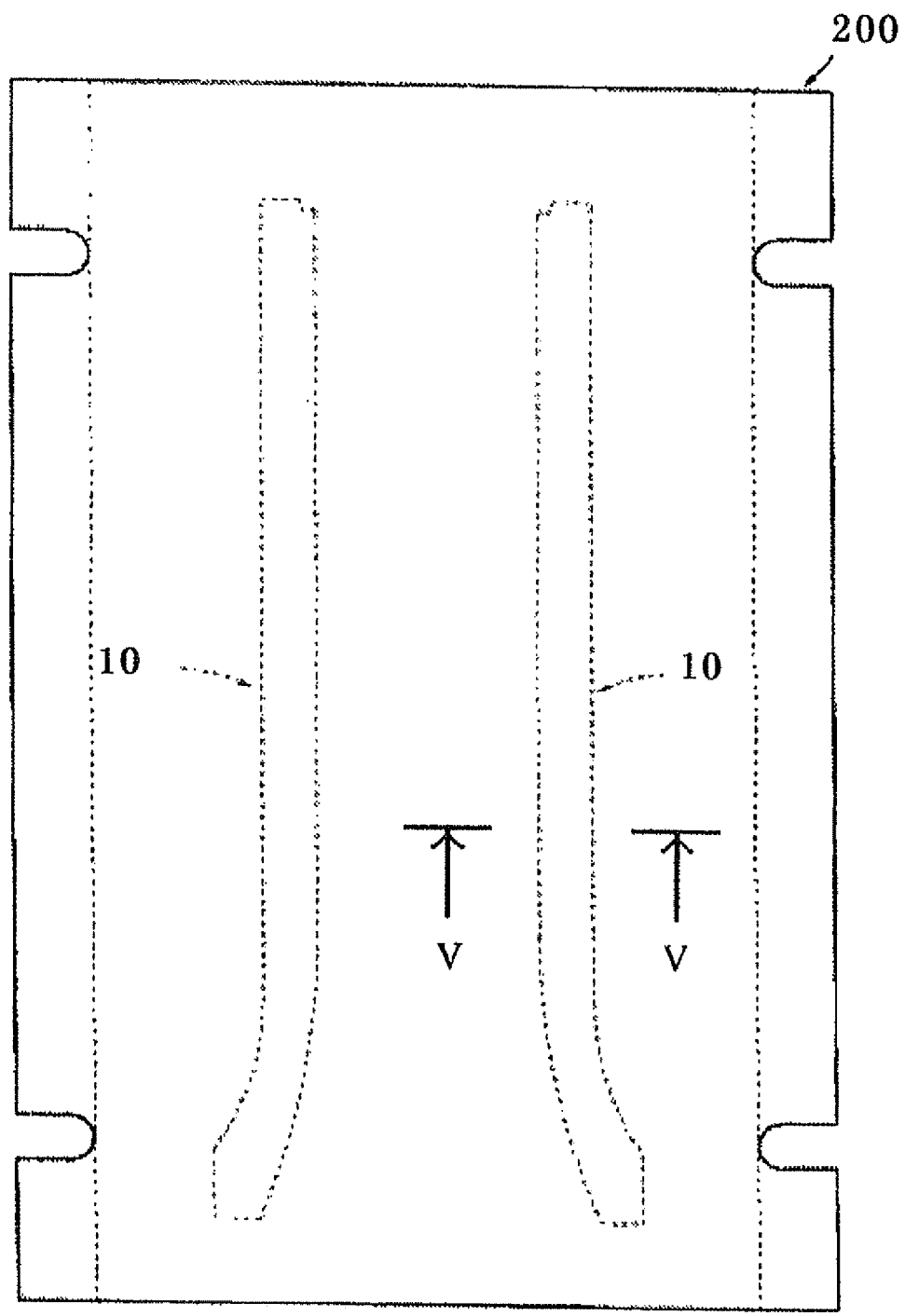
FIG. 11 is a plan view of a second injection molding die.

Next, a step of molding a cushion member will be described with reference to FIGS. 11 and 12.

In the openable and closable second injection molding die 200, when the injection molding die 200 is closed in a state where the main molding body 10 is placed within the injection molding die 200, the main molding body 10 is fixed by pinching both the front and rear faces (portions other than the portion where the cushion member 9 is molded) of the main molding body 10. Further, the cushion member molding cavities 210 and 210 (second member molding cavities) are formed in the outer peripheral portion of the cross section of the main molding body 10 by a molding face of the injection molding die 200 and a portion of the outer face of the main molding body 10, respectively.

Figure 12:
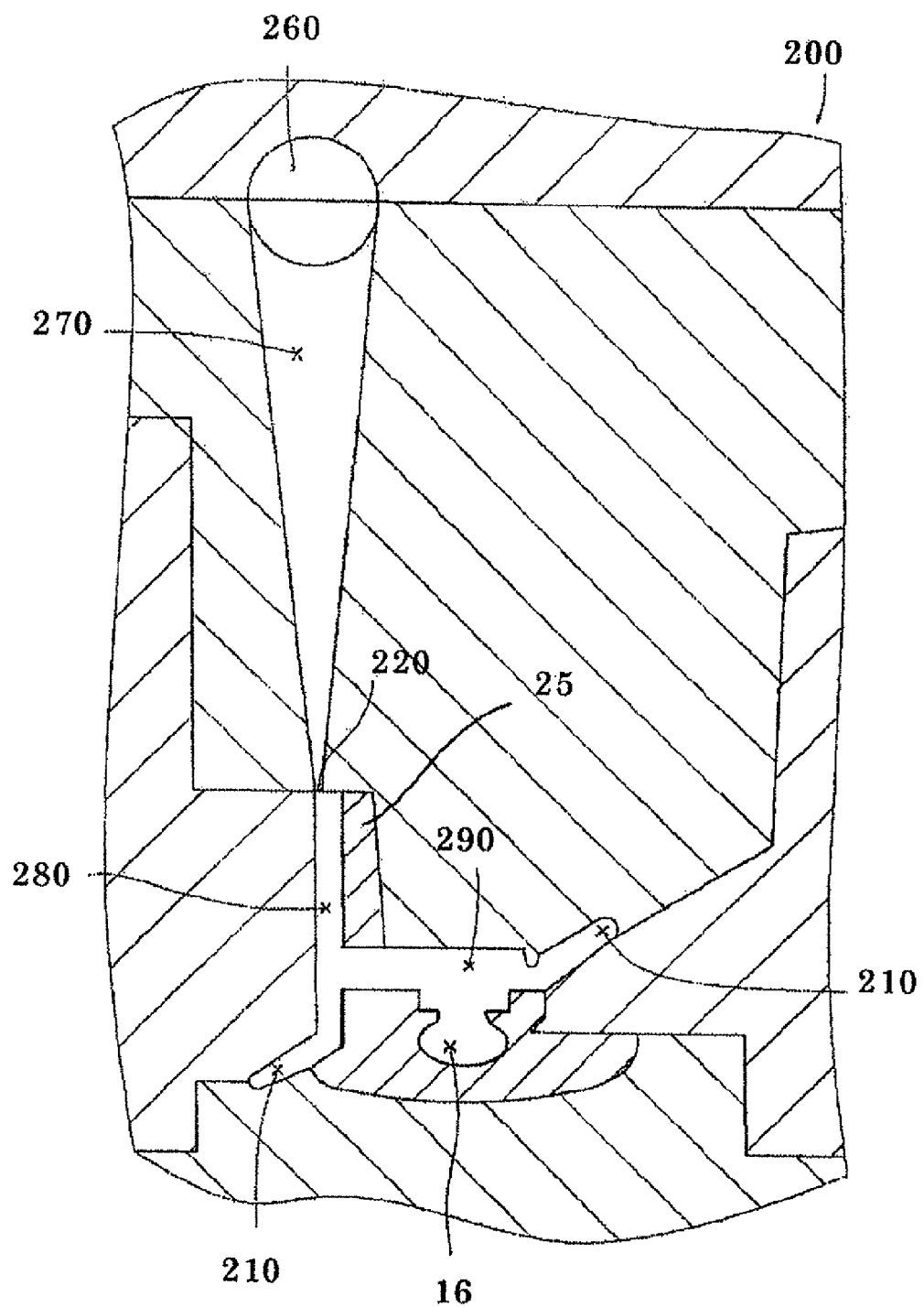
FIG. 12 is a cross-sectional view taken along line V-V of FIG. 11.

As shown in FIG. 12 a coupling channel 290, that is a cavity that molds a portion that becomes the coupling portion 70 of the cushion member 9, is formed at a position corresponding to the avoiding rib 25 of the main molding body 10 in the second injection molding die 200. An injection gate 220 that injects a thermoplastic polymer material for molding a cushion member into the cushion member molding cavity 210 is provided in the vicinity of the coupling channel 290. A thermoplastic polymer material for molding a cushion member that is injected from a nozzle (not shown) of an injection molding machine and is heated and melted flows in a route of runner 260→sprue 270→injection gate 220→injection passage 280→cushion member molding cavity 210. Additionally, the melting material injected from the injection gate 220 fills into one cushion member molding cavity 210, and flows to the other cushion member molding cavity 210 through the coupling channel 290. Thereby, the melting material fills into the molding cavities 210 and 210, respectively, without there being a shortage.

In addition, a position where the injection gate 220 is provided may be changed appropriately. For example, the injection gate 220 may be provided in the vicinity of the center of the coupling channel 290, that is, at a position corresponding to the vicinity of the central portion of the coupling portion 70 of the cushion member 9. Alternatively, the injection gate 220 may be provided at a position right above the through hole 15 formed in the main molding body 10. Otherwise, the injection gate 220 may be provided at a side of the rib portion 20 for panel mounting, of the main molding body 10. Moreover, the injection gate 220 is not limited to one location, and injection gates 220 may be provided at a plurality of locations at predetermined intervals along the longitudinal direction of the cushion member molding cavity 210. Additionally, coupling channels 290 (coupling portions 70) may also be provided at a plurality of locations along the longitudinal direction.

Then, in a case where the pillar molding 8 is manufactured, the aforementioned main molding body forming step (first member preparing step) is executed to inject-mold the main molding body 10. Thereafter, when the second injection molding die 200 for injection-molding the cushion member 9 is open, a placing step of placing (setting) the main molding body 10 at a predetermined position within the injection molding die 200 is performed.

Thereafter, a cavity forming step of closing the second injection molding die 200 and pinching both the front and rear faces (portions other than the portion where the cushion member 9 is molded) of the main molding body 10 using the injection molding die 200 to fix the main molding body 10 and of forming the cushion member molding cavities 210 by a molding face of a portion of the inner face of the injection molding die 200 and a portion of the outer face of the main molding body 10 is performed.

Thereafter, a cushion member forming step (second member forming step) of injecting and filling a heated and melted thermoplastic polymer material for molding a cushion member (for example, thermoplastic synthetic resin) into the cushion member molding cavity 210 of the second injection molding die 200, thereby forming the pillar molding 8 in which the cushion member 9 is bonded to integrate the main molding body 10 and the cushion member 9, is performed.

In the cushion member forming step, a heated and melted thermoplastic polymer material for molding a cushion member (elastic polymer material) is injected into the cushion member molding cavity 210 from the injection gate 220. The heated and melted thermoplastic polymer material for molding a cushion member fills the cushion member molding cavity 210 thereby. Then, the cushion member 9 is integrally joined to the main molding body 10 by at least one of heat and pressure of the injection-molded thermoplastic polymer material. Then, the cushion member 9 is molded at a predetermined position of the main molding body 10.

In this cushion portion forming step, the thermoplastic polymer material for molding a cushion member injected from the injection gate 220 fills the cushion member molding cavity. Further, the thermoplastic polymer material flows into the hollow space 16 via the through hole 15 that is formed in the peripheral wall 17 and communicates with the cushion member molding cavity. The thermoplastic polymer material for molding a cushion member that has flowed into the hollow space 16 fills over the entire length of the hollow space 16 while forcing out the gas within the hollow space 16 to the gas injection hole 18 and the gas discharge hole 19 that are formed at both terminals of the main molding body 10.

Thereafter, a taking-out step of opening the second injection molding die 200 and taking out the pillar molding 8 in which the main molding body 10 and the cushion member 9 are integrated is executed. Thereby, manufacturing of the pillar molding 8 is completed.

According to the above-described embodiment, a material softer than the main molding body 10 can be filled over the entire length of the hollow space 16, and the pillar molding 8 having excellent impact resistance can be easily manufactured.

Additionally, in the above-described embodiment, the cushion member 9 is annularly provided so as to surround the entire outer periphery of the main molding body 10. However, the invention is not limited thereto. For example, the cushion member 9 may be provided along the peripheral wall 17 on one side of the main molding body 10 in the width direction. Additionally, surface treatment such as color painting, clear painting or the like may be performed on the surface of the main molding body 10 before the cushion member 9 is molded.

Additionally, the main molding body 10 may not be molded in a series of steps as in the above-described embodiment, but the main molding body 10 in the state before the protruding portion 11 is removed or in the state where the protruding portion 11 is removed and the through hole 15 is formed may be prepared in advance by purchasing from the outside. In this case, the aforementioned main molding body forming step and through hole forming step can be omitted.

In addition, the invention is not limited to the pillar molding mounted along the front pillar of the vehicle. For example, the invention can be applied to and carried out in any composite molded articles in which a second member is injection-molded on the outer face of a first member having a hollow space therein, such as a pillar molding mounted along a center pillar or a rear pillar, a body side molding mounted on a vehicle body side panel, a wheel arch molding (including a mud guard) mounted along a wheel arch, and a belt molding mounted along a lower edge of a door opening window.

The present application is based on Japanese Patent Application No. 2010-167546 filed on Jul. 8, 2010, the content of which is incorporated herein by reference.

Reference Signs List
  1: ROOF PANEL
  2: FRONT PILLAR
  2a: OUTER PANEL
  3: WINDOW OPENING EDGE
  3a: WINDOW OPENING PORTION
  4: SIDE FLANGE
  5: BOTTOM FLANGE
  6: WINDOW PANE
  6a: VEHICLE OUTER FACE
  6b: REAR FACE 7: DAM RUBBER
8: PILLAR MOLDING
9: CUSHION MEMBER
10: MAIN MOLDING BODY
11: PROTRUDING PORTION
12: MAIN MOLDING BODY PORTION
13: RECESS PORTION
14: BOTTOM FACE
15: THROUGH HOLE
16: HOLLOW SPACE
16a: HOLLOW SPACE WITHIN PROTRUDING PORTION
17: PERIPHERAL WALL
17a: REAR WALL
17b: FRONT WALL
17c: SIDE WALL
18: GAS INJECTION HOLE
19: GAS DISCHARGE HOLE
20: RIB PORTION
21: ATTACHMENT RIB PORTION
22: FIRST REINFORCING RIB
23: SECOND REINFORCING RIB
24: THIRD REINFORCING RIB
25: AVOIDING RIB
26: COUPLING HOLE
30: FIRST EDGE
33: FRONT FACE
34: REAR FACE
35: REAR FACE
40: SECOND EDGE
50: FIRST CUSHION MEMBER
60: SECOND CUSHION MEMBER
67: TERMINAL COVER PORTION
68: TERMINAL CUSHION PORTION
70: COUPLING PORTION
80: FILLING PORTION
100: FIRST INJECTION MOLDING DIE
110: MAIN MOLDING BODY MOLDING CAVITY
111: PROTRUDING PORTION MOLDING CAVITY
120: INJECTION GATE
130: GAS INJECTION PORTION
141: DISCHARGE CHANNEL
142: CAVITY FOR DISCHARGE
150: SLIDE CORE
160: RUNNER
170: SPRUE
180: HIGH-PRESSURE GAS SUPPLY SOURCE
200: SECOND INJECTION MOLDING DIE
210: CUSHION MEMBER MOLDING CAVITY
220: INJECTION GATE
260: RUNNER
270: SPRUE
280: INJECTION PASSAGE
290: COUPLING CHANNEL

The invention claimed is:

1. A method for manufacturing a composite molded article which integrally includes: a main body member configured to be attached to a member to be attached, formed in an elongated shape from a polymer material having rigidity, and having a hollow space formed therein along a longitudinal direction thereof; and a cushion member formed from an elastic polymer material having a lower degree of hardness than the main body member, joined to an edge of the main body member, and having an elongated portion extending in the longitudinal direction along the edge, the method comprising:

a step of preparing the main body member to which a through hole, which allows the hollow space to communicate with external air, is formed to a peripheral wall surrounding the hollow space by removing at least one protruding portion which is formed to one surface of the peripheral wall and protrudes toward a direction away from the peripheral wall;

a step of setting the main body member in an injection molding die when the injection molding die is open, by using the openable and closable injection molding die for molding the cushion member;

a step of fixing the main body member within the injection molding die, forming a molding cavity for molding the cushion member by the main body member and a molding die face formed inside the injection molding die to at least a portion of the main body member in the longitudinal direction, and allowing the through hole to communicate with the molding cavity, by closing the injection molding die; and a step of injecting the heated and melted elastic polymer material from an injection gate after the injection molding die is closed, molding the cushion member by making a portion of the elastic polymer material flow into and fill the molding cavity, and forming a filling portion that fills the hollow space by making a portion of the elastic polymer material flow into and fill the hollow space from the through hole.

2. A method for manufacturing a composite molded article which integrally includes: a main body member configured to be attached to a member to be attached, formed in an elongated shape from a polymer material having rigidity, and having a hollow space formed therein along a longitudinal direction thereof, and a cushion member formed from an elastic polymer material having a lower degree of hardness than the main body member, joined to an edge of the main body member, and having an elongated portion extending in the longitudinal direction along the edge, the method comprising:

a step of preparing the main body member having at least one protruding portion on one surface of a peripheral wall surrounding the hollow space, the protruding portion protruding toward a direction away from the peripheral wall, having a root portion joined to the peripheral wall, and being configured to be broken at the root portion;

a step of forming a through hole, which allows the hollow space to communicate with external air, in the peripheral wall, by breaking the protruding portion at the root portion after the molding of the main body member;

a step of setting the main body member in an injection molding die when the injection molding die is open, by using the openable and closable injection molding die for molding the cushion member;

a step of fixing the main body member within the injection molding die, forming a molding cavity for molding the cushion member by the main body member and a molding die face formed inside the injection molding die to at least a portion of the main body member in the longitudinal direction, and allowing the through hole to communicate with the molding cavity, by closing the injection molding die; and a step of injecting the heated and melted elastic polymer material from an injection gate after the injection molding die is closed, molding the cushion member by making a portion of the elastic polymer material flow into and fill the molding cavity, and forming a filling portion that fills the hollow space by making a portion of the elastic polymer material flow into and fill the hollow space from the through hole.

3. A method for manufacturing a composite molded article which integrally includes: a main body member configured to be attached to a member to be attached, formed in an elongated shape from a polymer material having rigidity, and having a hollow space formed therein along a longitudinal direction thereof; and a cushion member formed from an elastic polymer material having a lower degree of hardness than the main body member, joined to an edge of the main body member, and having an elongated portion extending in the longitudinal direction along the edge, the method comprising:

a step of forming a first molding cavity by a molding die face formed inside a first injection molding die, by using the openable and closable first injection molding die for molding the main body member and closing the first injection molding die;

a step of molding the main body member by filling the heated and melted polymer material into the first molding cavity from an injection gate after the injection molding die is closed and injecting a fluid into the inside of the polymer material to form the hollow space, and of molding at least one protruding portion on one surface of a peripheral wall of the main body member surrounding the hollow space, the protruding potion protruding toward a direction away from the peripheral wall, having a root portion joined to the peripheral wall, and being configured to be broken at the root portion;

a step of forming a through hole, which allows the hollow space to communicate with external air, to the peripheral wall, by breaking the protruding portion at the root portion after the molding of the main body member;

a step of setting the main body member in the second injection molding die when the second injection molding die is open, by using the openable and closable second injection molding die for molding the cushion member;

a step of fixing the main body member within the second injection molding die, forming a second molding cavity for molding the cushion member by the main body member and a molding die face formed inside the second injection molding die to at least a portion of the main body member in the longitudinal direction, and allowing the through hole to communicate with the second molding cavity, by closing the second injection molding die; and a step of injecting the heated and melted elastic polymer material from an injection gate after the second injection molding die is closed, molding the cushion member by making a portion of the elastic polymer material flow into and fill the second molding cavity, and forming a filling portion that fills the hollow space by making a portion of the elastic polymer material flow into and fill the hollow space from the through hole.

4. The method for manufacturing a composite molded article according to claim 3,
  wherein, in the step of molding the protruding portion, a recess portion which is depressed closer to the hollow space than a rear face of the peripheral wall is molded, and the protruding portion is molded in a shape that protrudes from a bottom face of the recess portion.

5. The method for manufacturing a composite molded article according to claim 3,
  wherein, in the step of molding the protruding portion, the protruding portion is molded in a columnar shape and the recess portion is formed in a circular shape.

6. The method for manufacturing a composite molded article according to claim 5,
  wherein, in the step of molding the protruding portion, the protruding portion is molded such that a diameter of the protruding portion becomes smaller than a diameter of the recess portion.

7. The method for manufacturing a composite molded article according to claim 6,
  wherein, in the step of molding the protruding portion, the recess portion and the protruding portion are molded so as to be coaxial with each other.

8. The method for manufacturing a composite molded article according to claim 3,
  wherein the composite molded article has a first edge that faces a first portion of the member to be attached when being attached to the member to be attached, and a second edge that faces a second portion at a position different from the first portion,
  wherein the second molding cavity includes a cavity that molds the first edge, a cavity that molds the second edge, and a coupling channel that couples the first edge molding cavity and the second edge molding cavity,
  wherein the through hole is formed so as to communicate with the coupling channel, and
  wherein, in the step of molding the cushion member, the elastic polymer material flows into the hollow space from the coupling channel via the through hole.

9. The method for manufacturing a composite molded article according to claim 3,
  wherein a communication hole that allows the hollow space to communicate with the external air is formed at a position different from that of the through hole of the main body member, and
  wherein, in the step of molding the cushion member, the elastic polymer material flows into the hollow space from the through hole and gas within the hollow space is discharged to the outside from the communication hole.

10. The method for manufacturing a composite molded article according to claim 9,
  wherein the communication holes are formed at at least two locations, and the through hole is formed between the communication holes.

11. The method for manufacturing a composite molded article according to claim 9,
  wherein the communication hole is at least one of an injection hole and a discharge hole for the fluid that forms the hollow space in the step of molding the main body member.

12. The method for manufacturing a composite molded article according to claim 3,
  wherein a jig is used in the step of forming the through hole.

13. A composite molded article manufactured by the manufacturing method according to claim 3.

* * * * *